United States Patent
Xia et al.

(10) Patent No.: US 9,020,356 B2
(45) Date of Patent: Apr. 28, 2015

(54) POLARIZATION MULTIPLEXED SHORT DISTANCE CONNECTION

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 13/761,595

(22) Filed: Feb. 7, 2013

(65) Prior Publication Data

US 2014/0219658 A1 Aug. 7, 2014

(51) Int. Cl.
*H04B 10/00* (2013.01)
*H04J 14/06* (2006.01)

(52) U.S. Cl.
CPC ...................... *H04J 14/06* (2013.01)

(58) Field of Classification Search
CPC .................................... H04B 10/532
USPC ......................................... 398/141
See application file for complete search history.

(56) References Cited

U.S. PATENT DOCUMENTS

| | | | | |
|---|---|---|---|---|
| 5,430,795 A | * | 7/1995 | Taga et al. ...................... | 398/192 |
| 7,440,170 B2 | * | 10/2008 | Kao et al. ................... | 359/337.2 |
| 8,483,573 B2 | * | 7/2013 | Kotake et al. ................. | 398/152 |
| 2002/0163687 A1 | * | 11/2002 | Boden ........................... | 359/119 |

* cited by examiner

*Primary Examiner* — Danny Leung (57) ABSTRACT

A network device may include a polarizing multiplexing transmitter, a polarization maintaining (PM) fiber, and a polarizing demultiplexing receiver. The polarizing multiplexing transmitter may generate an optical signal, split the optical signal into a first and a second split optical signal, and modulate the split optical signals based on electrical signals to form first and second modulated optical signals. The polarizing multiplexing transmitter may polarization multiplex the first and second modulated optical signals to form a polarization multiplexed signal and transmit the polarization multiplexed signal via the PM fiber to the polarizing demultiplexing receiver. The polarizing demultiplexing receiver may polarization demultiplex the polarization multiplexed signal to form the first and second modulated optical signals and directly detect the first and the second split optical signal from the first and second modulated optical signals. The polarizing demultiplexing receiver may convert the first and the second split optical signal to the electrical signals.

20 Claims, 8 Drawing Sheets

POLARIZATION MULTIPLEXED SHORT DISTANCE CONNECTION

BACKGROUND INFORMATION

A central office (CO) is a physical building used to house communications equipment that provides connections and relay data including voice, video and other information. For example, in the field of telecommunications, such communications equipment may include a telephone exchange or telephone switch, which is a system of electronic components that connects telephone calls. The communications equipment may be connected within the CO using a short distance interface.

The short distance interface may be used to cover distances between communications equipment in the approximate range of 100 meters to 500 meters. The short distance interface may be implemented by different transceivers, such as a small form factor pluggable transceiver (SFP) (e.g., 1 Gigabit per second (Gb/s) to 2.7 Gb/s for Gigabit Ethernet (GE), a 10G form factor pluggable transceiver (XFP) or a C form-factor pluggable transceiver (CFP) (e.g., for 40GE, optical carrier 768 (OC768), optical transport unit level 3 (OTU3), 100GE, etc.). SFP and XFP transceivers use single wavelength, while CFP may use between 4 wavelengths or 10 wavelengths, since, as data rates increase, a single wavelength cannot handle the data rate requirement due to modulator bandwidth limitation.

BRIEF DESCRIPTION OF THE DRAWINGS

FIG. 5 A and FIG. 5B are diagrams illustrating, respectively, an exemplary polarizing multiplexing transmitter and an exemplary polarizing demultiplexing receiver, including polarization maintaining connectors, according to implementations described herein;

DETAILED DESCRIPTION OF PREFERRED EMBODIMENTS

The following detailed description refers to the accompanying drawings, The same reference numbers in different drawings identify the same or similar elements.

Systems and/or methods described herein may implement a polarized multiplexed short distance connection between communications equipment. The polarized multiplexed short distance connection may include a polarizing multiplexing transmitter, a polarizing demultiplexing receiver, and a polarization maintaining fiber. Optical carrier signals may be polarized and multiplexed onto a single polarized maintaining optical fiber using wavelength division multiplexing (WDM) or coarse wavelength division multiplexing (CWDM). In one implementation, polarization maintaining connectors may be positioned between the interfaces with the polarization maintaining fiber of the polarizing multiplexing transmitter, and the polarizing demultiplexing receiver.

Consistent with embodiments, different modulation schemes, such as on-off keying (OOK), differential quadrature phase shift keying (DQPSK), or amplitude shift keying (ASK), may be applied to the optical carrier signals. An implementation described herein relates to a duplex configuration of the polarized multiplexed transceiver. Another implementation relates to an integrated active cable configuration of the polarized multiplexed transceiver.

Figure 1:
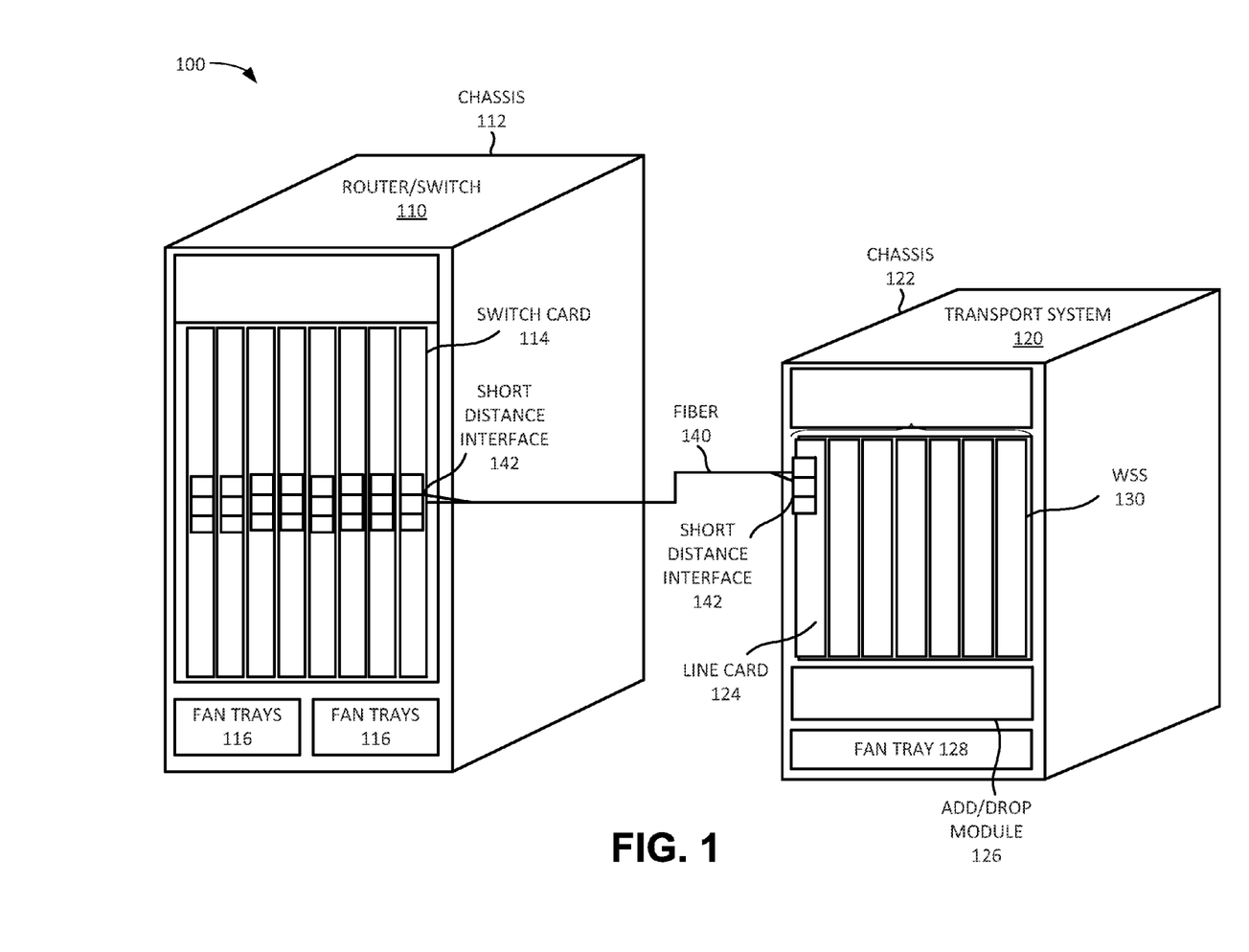
FIG. 1 is a diagram illustrating exemplary communications equipment with a short distance connection according to an implementation described herein.

FIG. 1 is a diagram illustrating an exemplary short distance connected system 100 according to an implementation described herein. As shown in FIG. 1, short distance connected system 100 may include a router/switch 110, a transport system 120, and a fiber 140, Communications equipment, such as a router/switch 110 and a transport system 120, may transmit and receive optical signals via fiber 140 that connects router/switch 110 with transport system 120 at short distance interfaces 142. Although FIG. 1 shows exemplary components of short distance connected system 100, in other implementations, short distance connected system 100 may include fewer components, different components, differently arranged components, or additional components than depicted in FIG. 1. Additionally or alternatively, one or more components of short distance connected system 100 may perform functions described as being performed by one or more other components of short distance connected system 100.

In one embodiment, router/switch 110 may include a chassis 112, a switch card(s) 114 (referred to herein collectively as "cards 114" and individually as "card 114"), and fan trays 116. Router/switch 110 may be configured to enable cards installed therein to communicate with each other. Router/switch 110 may also include a printed circuit board (PCB) (not shown in FIG. 1). The PCB may include electrical components, such as integrated circuit (IC) chips, passive electrical components, and/or electrical traces that interconnect the electrical components. The IC chips may include processors, application-specific integrated circuits (ASICs), field-programmable gate arrays (FPGA), and/or another type of integrated circuit or processing logic; memory devices such as a random access memory (RAM) or another type of dynamic storage device, a read-only memory (ROM) device or another type of static storage device, a content addressable memory (CAM), a magnetic and/or optical recording memory device and/or another type of memory. Chassis 112 may include a metal frame that provides structural stability to router/switch 110 and provides electromagnetic shielding to cards installed in router/switch 110. Card 114 may include a set of front connectors to enable each card 114 to be connected to other devices via electrical and/or optical cables. Fan trays 116 may house fans for cooling router /switch 110.

Transport system 120 may include a chassis 122, a line card(s) 124, an add/drop module 126, a fan tray 128, and a wavelength selective switch (WSS) 130. Chassis 122 may provide structural stability to transport system 120 and may include openings for receiving line cards 124. Line cards 124 may each include modular electronic circuit on a PCB that interfaces with a telecommunications access network. Add/drop module 126 (sometimes referred to as a reconfigurable add/drop multiplexer (ROADM)) may manage wavelengths and process and transfer data between networks. Fan tray 128 may house one or more fans for cooling transport system 120. WSS 130 may integrate devices for wavelength multiplexing/demultiplexing of wavelength division multiplexing (WDM) signals and mechanisms to switch signals on a per-wavelength basis.

A short distance connection may connect communications equipment, such as router/switch 110 and transport system 120, via fiber 140 that carries optical signals across short distance interfaces 142 with the communications equipment. Each short distance interface 142 may be a point at which optical signals are passed from particular communications equipment or medium to fiber 140 without conversion to an electrical signal. In implementations described herein, communications equipment may be connected by a polarized multiplexed short distance connection that includes polarization multiplexing of the optical signal, resulting in an effective doubling of the corresponding data rate capacity. The polarized multiplexed short distance connection may be implemented with WDM or CWDM as an optical carrier arrangement. The polarization of the optical signal may be maintained from transmitter to receiver as described with respect to FIGS. 2 to 8.

Figure 2:
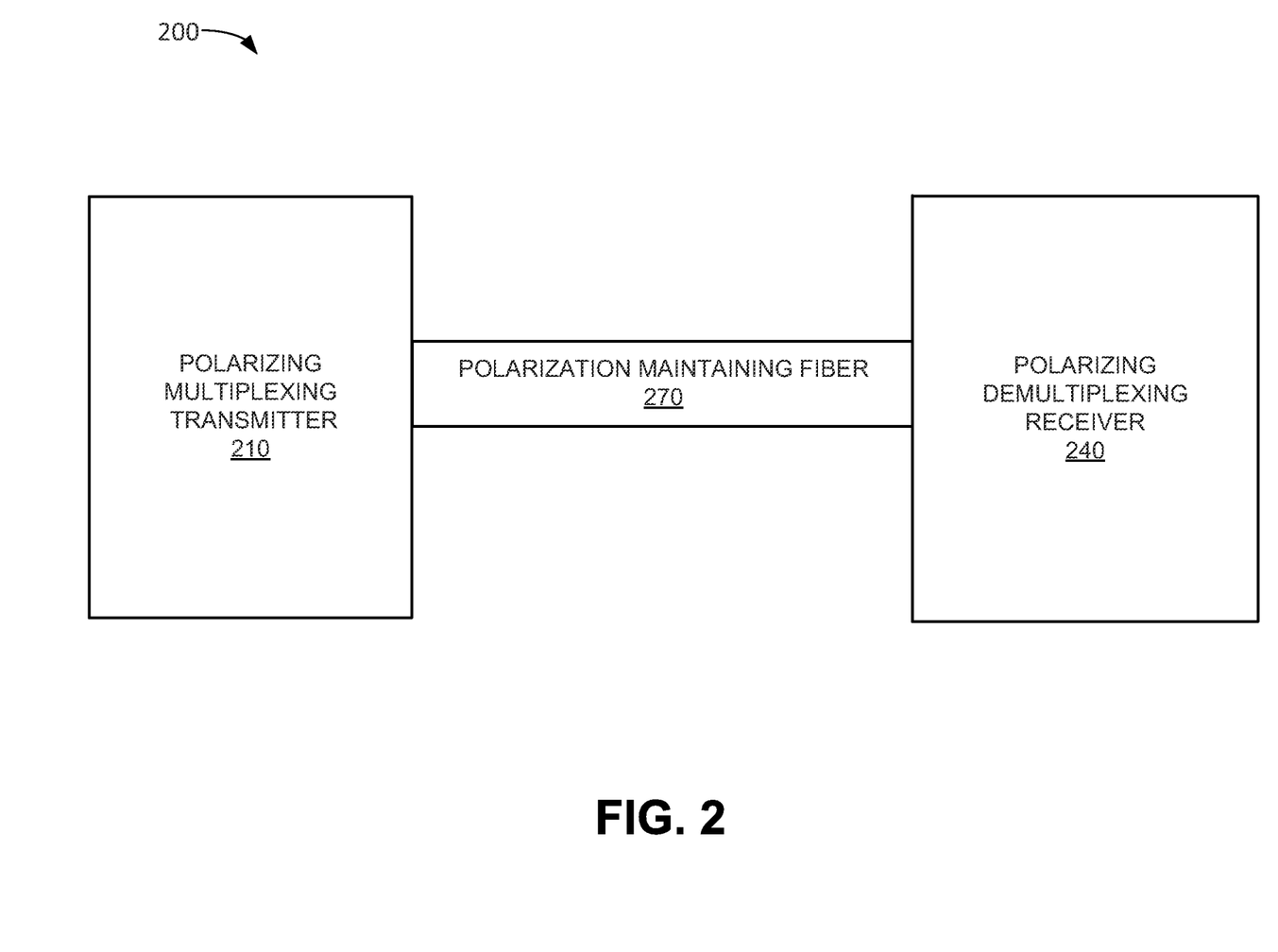
FIG. 2 is a diagram illustrating an exemplary polarized multiplexed short distance connection according to an implementation described herein.
Figure 3A:
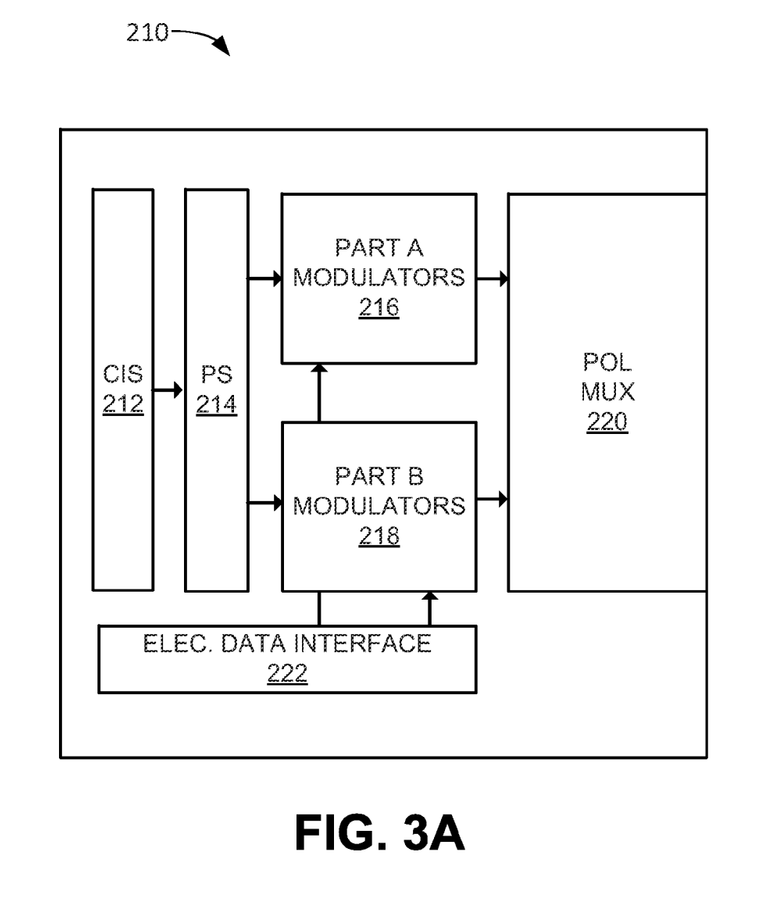
FIG. 3A is a diagram illustrating an exemplary polarizing multiplexing transmitter according to an implementation described herein.
Figure 3B:
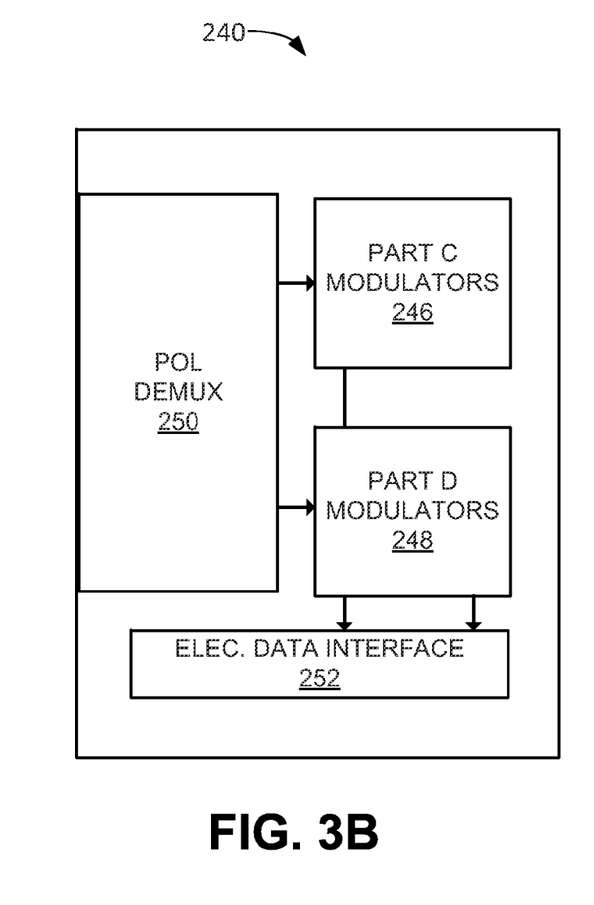
FIG. 3B is a diagram illustrating an exemplary polarizing demultiplexing receiver according to an implementation described herein.

FIG. 2 is a diagram illustrating an exemplary polarized multiplexed short distance connection 200 according to an implementation described herein. As shown in FIG. 2, polarized multiplexed short distance connection 200 may include a polarizing multiplexing transmitter 210, a polarizing demultiplexing receiver 240 and a polarization maintaining (PM) fiber 270. Polarizing multiplexing transmitter 210 and polarizing demultiplexing receiver 240 are described with respect to FIGS. 3A and 3B respectively. Although FIGS. 2, 3A and 3B show exemplary components of polarized multiplexed short distance connection 200, in other implementations polarized multiplexed short distance connection 200 may include fewer components, different components, differently arranged components, or additional components than depicted in FIGS. 2, 3A and 3B.

As shown in FIG. 2, polarized multiplexed short distance connection 200 may provide a high capacity connection for optical signals between polarizing multiplexing transmitter 210 and polarizing demultiplexing receiver 240. In contrast, other designs of short distance connections for higher data rates may require at least 40 wavelengths, and corresponding costly high wavelength precision control. Polarized multiplexed short distance connection 200 may use WDM or CWDM as optical carrier arrangement. Polarization multiplexing of optical signals may result in two orthogonal polarized optical signals. Polarization multiplexing uses the polarization of electromagnetic radiation to separate orthogonal channels that may be transmitted in a same (i.e., the optical signals are propagated in a non-overlapping manner). Polarizing multiplexing transmitter 210 may use polarization multiplexing to double the capacity of polarized multiplexed short distance connection 200. Polarized multiplexed short distance connection 200 may be implemented in short distance telecommunications applications that require higher data rates, such as 1 terabyte (Tb)/s.

Polarized multiplexed short distance connection 200 may be implemented with direct detection of the received optical signal. Coherent detection of the received optical signal is not required. In addition, polarized multiplexed short distance connection 200 does not require complicated polarization demultiplexing of the received optical signal. Polarized multiplexed short distance connection 200 may support ultra-high speed interfaces with low cost compared to short distance connections that use non-polarized fiber. Current designs for short distance connections may require 40 wavelengths and corresponding high wavelength precision control at higher data rates (e.g., 1 Tb/s). By contrast, polarized multiplexed short distance connection 200 may support the higher data rates without required corresponding high wavelength precision control.

PM fiber 270 may be an optical fiber in which polarization of the optical carrier (i.e., linearly polarized light waves) into the PM fiber 270 is maintained during propagation of the optical signal with minimized mode coupling between polarization modes. PM fiber 270 may be selected with a length that minimizes mode coupling and reduces cost. The optical signals on two polarizations (i.e., two orthogonal channels) may be completely separated in PM fiber 270. PM fiber 270 may be used in a telecommunications optical connection.

Polarizing multiplexing transmitter 210, as shown in FIG. 3A, may include a CWDM integrated source (CIS) 212, a power splitter (PS) 214, part A modulators 216 and part B modulators 218 (part A modulators 216 may include 20 integrated modulators with 28 Gb/s on/off keying (OOK) and part B modulators 218 may include 20 integrated modulators with 28 Gb/s OOK), a polarization multiplexer 220, and an electrical (elec) data interface 222.

CIS 212 may include a multiple wavelength (e.g., 20-wavelength) CWDM integrated source that may include a CWDM laser and components (e.g., a Photonic Integrated Circuit (PIC) or other known multicarrier generating architectures) to produce a single carrier optical channel and/or a multicarrier optical channel, such as a super-channel. CWDM laser may require loose wavelength control (i.e., wavelength precision requirement is reduced compared to, for example, a DWDM laser). In an alternative implementation, a dense DWDM laser may be substituted for the CWDM laser.

PS 214 may include an optical power splitter and/or an optical power combiner that is/are color-agnostic, directionless, and contentionless. PS 214 may provide for splitting and/or combining of optical signals in optical fibers.

Part A modulators 216 and part B modulators 218 may include optical modulators to provide a modulation format in terms of constellation (e.g., binary, quaternary, 8-ary, 16-ary, higher order constellations, etc.), manner of modulation (e.g. intensity, phase, frequency, polarization), etc. Part A modulators 216 and part B modulators 218 may apply simple modulation to the transmitted optical signal. In one implementation, part A modulators 216 and part B modulators 218 may apply an OOK modulation scheme based on the electrical signal received from electrical data interface 222 to the optical signal.

Polarization multiplexer 220 may multiplex two input signals in orthogonal polarizations into a single output signal.

Electrical data interface 222 may provide an interface to electrical data that is to be transmitted across polarized multiplexed short distance connection 200.

Polarizing demultiplexing receiver 240, as shown in FIG. 3B, may include part C modulators 246 and part D modulators 248 (e.g., part C modulators 246 may include 20 integrated modulators with 28 Gb/s on/ OOK and part D modulators 248 may include 20 integrated modulators with 28 Gb/s OOK), a polarization demultiplexer (demux) 250, and an elec data interface 252.

Part C modulators 246 and part D modulators 248 may include optical modulators to provide a modulation format in terms of constellation (e.g., binary, quaternary, 8-ary, 16-ary, higher order constellations, etc.), manner of modulation (e.g. intensity, phase, frequency, polarization), etc.

Demultiplexer 250 may include a device that receives an incoming signal comprising multiple wavelengths and spatially separates the component wavelengths of the received signal, such that there are a number of separate outgoing signals at each component wavelength.

Electrical data interface 252 may provide an interface to output the electrical data is received across polarized multiplexed short distance connection 200.

With respect to alignment of the modulators in polarizing multiplexing transmitter 210 and polarizing demultiplexing receiver 240 to PM fiber 270, part A modulators 216 may be aligned to one polarization mode of PM fiber 270 and part B modulators 218 may be aligned to another polarization mode of PM fiber 270. Similarly, part C modulators 246 may be aligned to one polarization mode of the PM fiber 270 and part D may be aligned to the other polarization mode of PM fiber 270.

Figure 4:
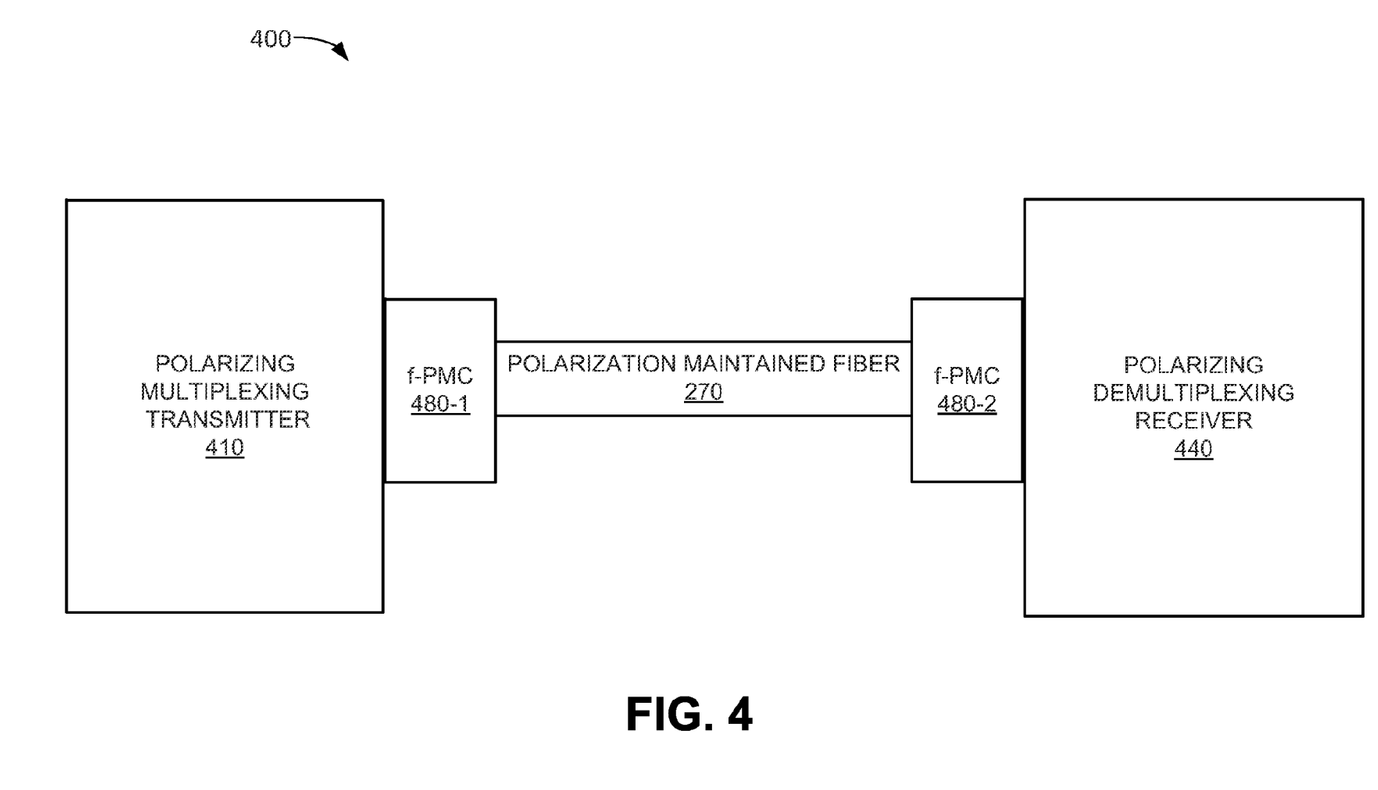
FIG. 4 is a diagram illustrating an exemplary polarized multiplexed short distance connection, including polarization maintaining connectors, according to an implementation described herein.

FIG. 4 shows an exemplary polarized multiplexed connectorized short distance connection 400 according to an implementation described herein. As shown in FIG. 4, polarized multiplexed short distance connection 400 may include a polarizing multiplexed transmitter 410, a polarized demultiplexed receiver 440, fiber-side polarization maintaining connectors (PMCs) 482 (shown as f-PMC 482-1 and f-PMC 482-2) and polarization maintaining fiber 270. Polarized multiplexed transmitter 410 and polarized demultiplexed receiver 440 are described with respect to FIGS. 5A and 5B respectively. Although FIGS. 4, 5A and 5B show exemplary components of polarized multiplexed short distance connection 400, in other implementations, polarized multiplexed short distance connection 400 may include fewer components, different components, differently arranged components, or additional components than depicted in FIGS. 4, 5A and 5B.

Polarized multiplexed short distance connection 400 may be an implementation of polarized multiplexed short distance connection 200 in which polarization maintaining fiber PMCs 482 mechanically couple PM fiber 270 to polarized multiplexed transmitter 410 at one end, and polarizing demultiplexing receiver 440 at the other end.

Figure 5A:
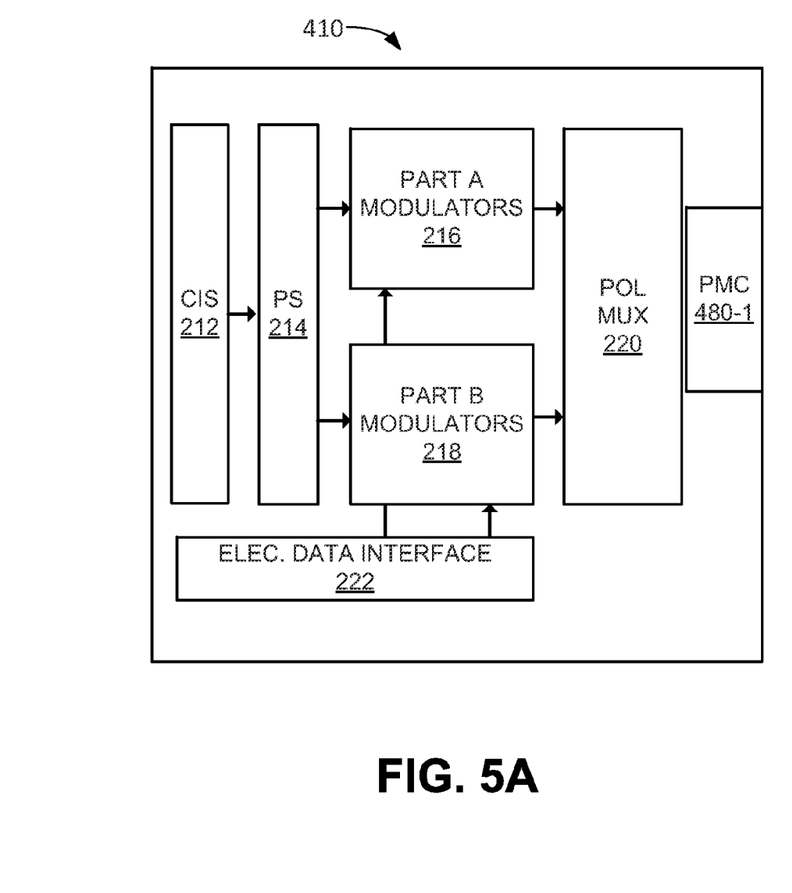
Figure 5B:
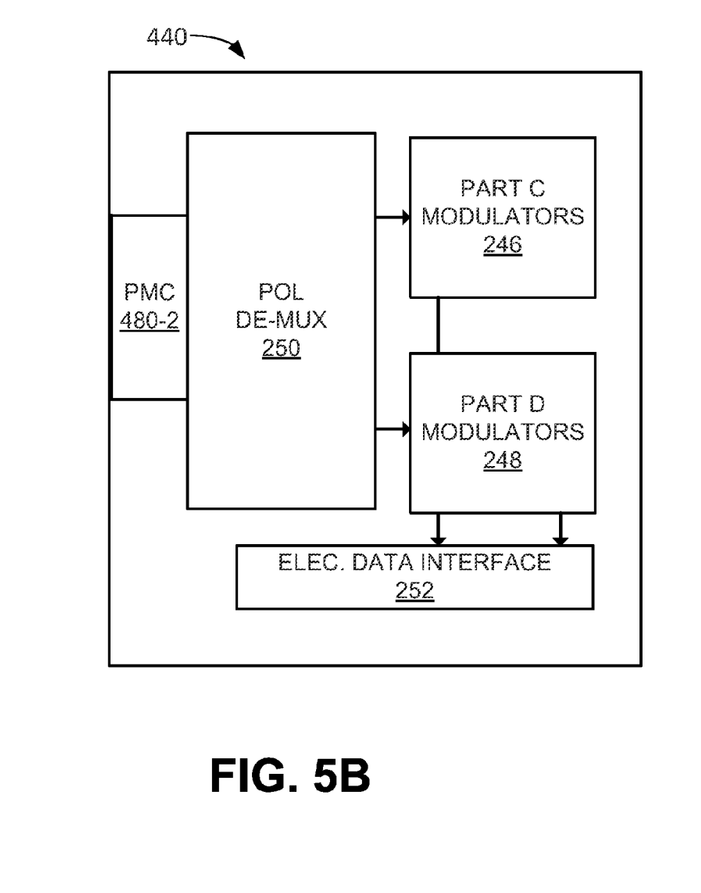

Polarized multiplexed transmitter 410 as shown in FIG. 5A, may include CIS 212, PS 214, part A modulators 216 and part B modulators 218, polarization multiplexer 220, polarization maintaining connector 480-3, and elec data interface 222. Polarizing demultiplexing receiver 440 as shown in FIG. 5B, may include part C modulators 246 and part D modulators 248, a polarization demultiplexer 250, polarization maintaining connector 480-1 and elec data interface 252.

Polarized multiplexed connectorized short distance connection 400 may include a PM fiber 270 that is connectorized. In other words, f-PMCs 482-1 and 482-2 may be attached to each end of PM fiber 270 and connector to corresponding PMCs 480-1 and 480-2 in polarizing multiplexing receiver 410 and polarized multiplexed connectorized receiver 440, respectively. F-PMCs 482 may allow fastening together PM fiber 270 with polarizing multiplexing receiver 410 on one end and polarizing demultiplexing receiver 440 on the other end. Polarization maintaining connectors 480/482 may allow quicker connection and disconnection of PM fiber 270 to polarizing multiplexing receiver 410 and polarizing demultiplexing receiver 440 than splicing.

F-PMC 482-1 (shown in FIG. 4) and PMC 480-1 (shown in FIG. 5A) may mechanically couple PM fiber 270 with polarizing multiplexing receiver 410 and align the core of PM fiber 270 with the optical signal from polarizing multiplexing receiver 410 so that the output signal is transmitted and polarization is maintained for the optical signal. F-PMC 482-2 (shown in FIG. 4) and PMC 480-2 (shown in FIG. 5B) may similarly couple PM fiber 270 with polarizing demultiplexing receiver 440. Signals in two polarizations transmitted across polarization maintaining fiber 270 may be separated all the way from transmission at polarizing multiplexing receiver 410 to reception at polarizing demultiplexing receiver 440.

According to one implementation, modulators in each of polarizing multiplexing receiver 410 and polarizing demultiplexing receiver 440 (i.e., part A modulators 216, part B modulators 218, part C modulators 246, and part D modulators 248) may include 20-integrated modulators with 14 Gb/s differential quadrature phase shift keying (DQPSK). In this instance, with DQPSK modulation formats, a symbol rate associated with transmission across the polarized multiplexed connectorized short distance connection 400 may be half of the transmission rate for 28 Gb/s OOK. Signals are transmitted in two polarizations and are separated throughout transmission from the transmitters to receivers (e.g., from polarizing multiplexing receiver 410 to polarizing demultiplexing receiver 440), The received signal may be directly detected after demultiplexing by polarization demultiplexer 250.

According to another implementation, modulators in polarizing multiplexing receiver 410 (i.e., part A modulators 216 and part B modulators 218) may include 20-integrated modulators with 14 Gb/s 4-level amplitude shift keying (ASK). Similarly, modulators in polarizing demultiplexing receiver 440 (i.e., part C modulators 246, and part D modulators 248) may include 20-wavelength CWDM integrated detectors with 14 Gb/s ASK direct detection. In this instance, with ASK modulation formats, signals in two polarizations are separated all the way from the transmitters to receivers. Additionally, the optical signal may be detected using 4-level ASK direct detection.

According to another implementation, CIS 212 may include a 20-wavelength integrated source in C-band with 200 Gigahertz (GHz) grid spacing. Modulators in polarizing multiplexing receiver 410 (i.e., part A modulators 216 and part B modulators 218) may include 20-integrated modulators with 14 Gb/s 4-level amplitude shift keying (ASK). Similarly, modulators in polarizing demultiplexing receiver 440 (i.e., part C modulators 246, and part D modulators 248) may include 20-wavelength CWDM integrated detectors with 14 Gb/s ASK direct detection. In this instance, polarized multiplexed connectorized short distance connection 400 may use 20 wavelengths in C-band with 200 GHz carrier spacing. Signals in two polarizations may be separated throughout transmission from polarizing multiplexing receiver 410 to polarizing demultiplexing receiver 440.

Figure 6:
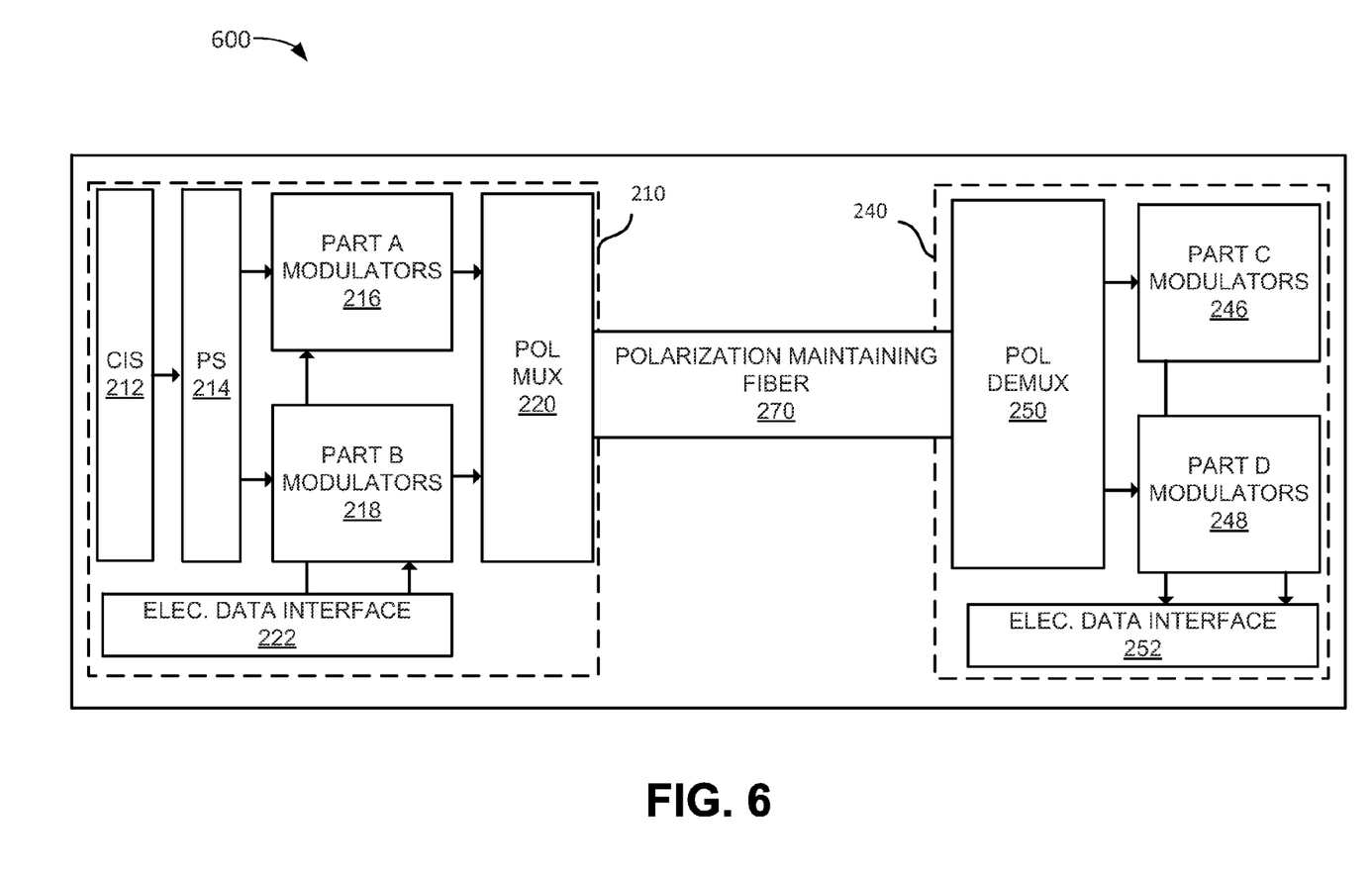
FIG. 6 is a diagram illustrating an exemplary integrated polarized multiplexed transceiver according to an implementation described herein.

FIG. 6 shows an exemplary integrated polarized multiplexed short distance connection 600 according to an implementation described herein. As shown in FIG. 6, integrated polarized multiplexed short distance connection 600 may include polarizing multiplexing transmitter 210, polarizing demultiplexing receiver 240 and PM fiber 270. Although FIG. 6 shows exemplary components of integrated polarized multiplexed short distance connection 600, in other implementations, integrated polarized multiplexed short distance connection 600 may include fewer components, different components, differently arranged components, or additional components than depicted in FIG. 6.

Polarizing multiplexing transmitter 210, as shown in FIG. 6, may include CIS 212, PS 214, part A modulators 216 and part B modulators 218 (part A modulators 216 may include 20 integrated modulators with 28 Gb/s OOK and part B modulators 218 may include 20 integrated modulators with 28 Gb/s OOK), polarization multiplexer 220 and elec data interface 222. Polarizing demultiplexing receiver 240 may include part C modulators 246 and part D modulators 248 (e.g., part C modulators 246 may include 20 integrated modulators with 28 Gb/s on/OOK and part D modulators 248 may include 20 integrated modulators with 28 Gb/s OOK), a polarization demultiplexer 250, and elec data interface 252.

In this instance integrated polarized multiplexed short distance connection 600 may be implemented as integrated as an "active cable" that does not include connectors, such as polarization maintaining connectors 480 described above with respect to FIGS. 4, 5A and 5B. The active cable design connects PM fiber 270 directly to polarizing multiplexing transmitter 210 and polarizing demultiplexing receiver 240. Polarizing multiplexing transmitter 210, polarizing demultiplexing receiver 240 and PM fiber 270 may be integrated and aligned into a single device negating a requirement for connectors to attach the different components.

Figure 7:
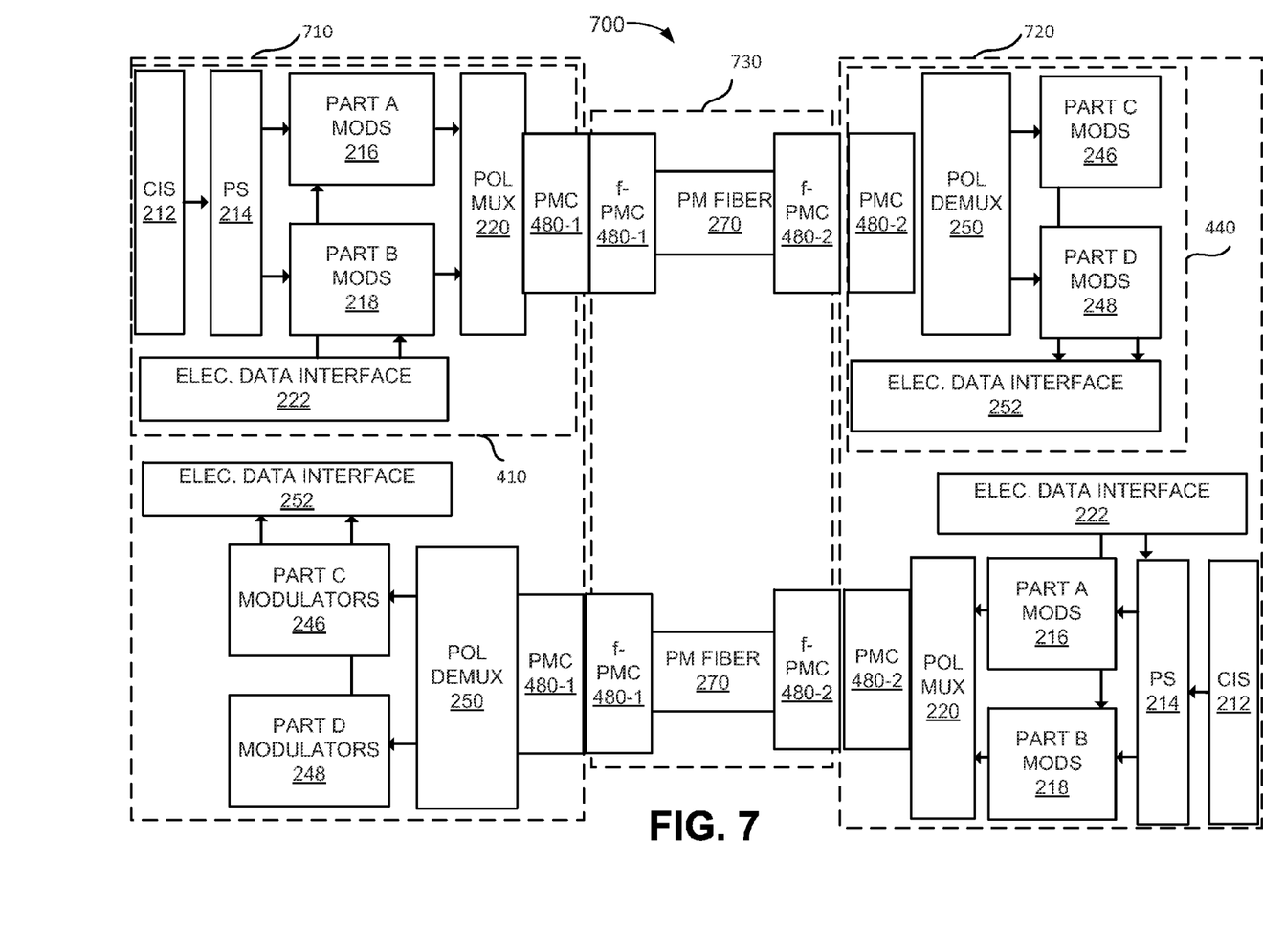
FIG. 7 is a diagram illustrating an exemplary duplex polarized multiplexed short distance connection according to an implementation described herein.

FIG. 7 shows an exemplary duplex polarized multiplexed connectorized short distance connection 700 according to an implementation described herein. As shown in FIG. 7, duplex polarized multiplexed connectorized short distance connection 700 may include a first polarized multiplexed transceiver 710, a second polarized multiplexed transceiver 720 and a duplex cable 730. Although FIG. 7 shows exemplary components of duplex polarized multiplexed connectorized short distance connection 700, in other implementations, duplex polarized multiplexed connectorized short distance connection 700 may include fewer components, different components, differently arranged components, or additional components than depicted in FIG. 7.

Duplex polarized multiplexed connectorized short distance connection 700 may include polarized multiplexed transceivers 710 and 720 configured to transmit and to receive polarized multiplexed optical signals from a corresponding device, e.g., to allow two way communication between router 110 and transport system 120.

Polarized multiplexed transceivers 710 and 720 may each include a polarizing multiplexing receiver 410 and a polarizing demultiplexing receiver 440, such as described with respect to FIGS. 4, 5A and 5B, which may be with PM fibers 270 in duplex cable 730. Duplex cable 730 may include two PM fibers 270 and polarization maintaining connectors 480 that may mechanically couple and align each end of the PM fibers 270 with corresponding polarizing multiplexing receiver 410 and polarizing demultiplexing receiver 440 to allow transmission and receipt of polarized multiplexed optical signals. The second multiplexed connectorized transmitter 410 and the second polarizing demultiplexing receiver 440 allow bidirectional communication.

The implementations described above, with respect to FIGS. 2, 3A, 3B, 4, 5A, 5B, 6 and 7 illustrate describe various features of polarized multiplexed short distance connection 200 and different embodiments and modifications. Although particular embodiments are disclosed, different combinations of features may be implemented. Polarized multiplexed short distance connection 200 may be a cost effective implementation of a short distance telecommunications connection using CWDM for Tb/s interface. The cost of PM fiber 270 may be reduced for short distances (e.g., less than 500 m). Polarized multiplexed short distance connection 200 may be implemented with various modulation formats and direct detection, such as ASK, multi-level ASK, differential phase shift keying (DPSK), DQPSK, etc. Polarized multiplexed short distance connection 200 may be active cable or pluggable with passive cable. Polarized multiplexed short distance connection 200 may be implemented for rate standards such as 400G, 1T, and higher data rate standards.

Figure 8:
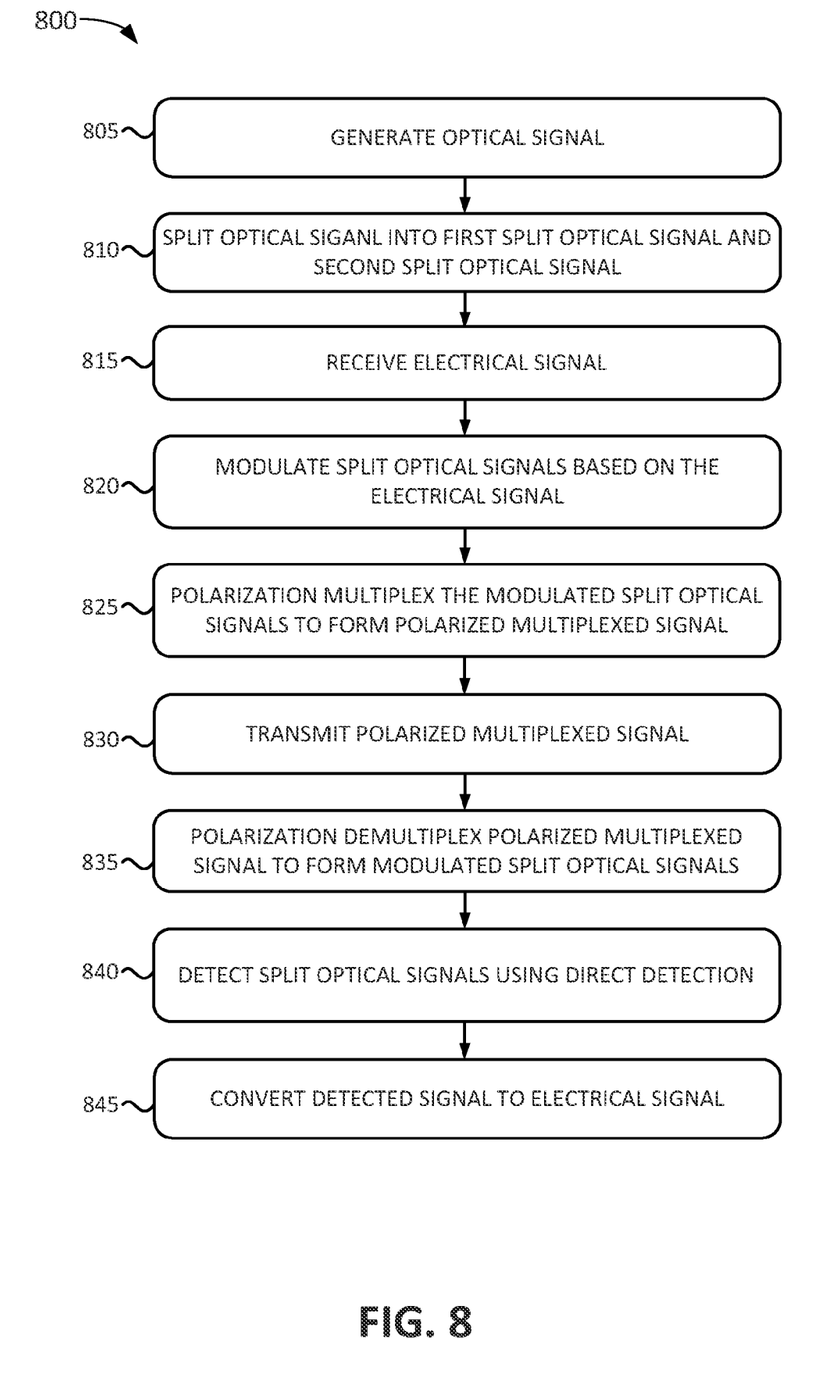
FIG. 8 is a flow chart of an exemplary process for operating a polarized multiplexed connection according to an implementation described herein.

Polarized multiplexed short distance connection 200 (i.e., the design of polarized multiplexed short distance connection 200) may reduce the number of laser sources to half when compared with non-polarization multiplexed designs, and polarization multiplexed short distance connection 200 also eliminates the complexity of coherent detection as in traditional polarization multiplexed designs. This leads to dramatic reduction in power consumption and costs. In addition, polarization multiplexed short distance connection 200 also relaxes wavelength control requirement compared with non-polarization multiplexed design since only half the number of wavelengths are needed, FIG. 8 is a flow chart of an exemplary process for operating a polarized multiplexed connection according to an implementation described herein. In one implementation, the process of FIG. 8 may be performed by polarized multiplexed short distance connection 200. In other implementations, some or all of the process of FIG. 8 may be performed by another device or a group of devices separate from polarized multiplexed short distance connection 200 and/or including polarized multiplexed short distance connection 200.

The process of FIG. 8 may include generating an optical carrier signal (block 805), For example, CIS 212 may generate an optical signal that includes 20 discrete wavelengths.

At block 810, PS 214 may receive the optical signal generated by CIS 212. PS 214 may split the optical signal to form a first split optical signal and a second split optical signal and send the split signals to part A modulators 216 and part B modulators 218, respectively.

Part A modulators 216 and part B modulators 218 may receive an electrical signal from electrical data interface (block 815). The electrical signal may include data that is to be transmitted across PM fiber 270.

At block 820, part A modulators 216 and part B modulators 218 may apply modulation to the split signals based on a predetermined modulation scheme, such as ASK, multi-level ASK, differential phase shift keying (DPSK), DQPSK, etc. For example, Part A modulators 216 may receive a split optical signal that includes 20 wavelengths and apply modulation, such as an OOK modulation scheme to the first split optical signal based on electrical signals received over the electrical data interface 222. Similarly, Part A modulators 216 may apply modulation based on the electrical signals to second split optical signal.

The modulated split optical signals may be polarization multiplexed to form a polarization multiplexed signal (block 825) and sent via PM fiber 270 (block 830) to polarizing demultiplexing receiver 240.

At block 835, the polarization multiplexed signal may be polarization demultiplexed to form modulated split optical signals. The modulated split optical signals may be detected using direct detection (block 840). The detected signals may be converted to electrical signals and output via electrical data interface (block 845).

Systems and/or methods described herein may provide polarized multiplexed short distance connection between communications equipment. Furthermore, the amount of data exchanged between cards in a rack system, as well as the speeds at which the data is exchanged, may also continue to increase. Polarized multiplexed short distance connections may be implemented for ultra-high interfaces such as next short distance interface will be 400 Gb/s or 1 Tb/s in a compact and cost effective manner.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments, Thus, the operation and behavior of the systems and methods were described without reference to the specific software code-it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A network device comprising:
   a polarizing multiplexing transmitter;
   a polarization maintaining (PM) fiber;
   a polarizing demultiplexing receiver,
   wherein the polarizing multiplexing transmitter is configured to:
      generate an optical signal based on an integrated wave division multiplexing (WDM) source,
      split the optical signal into a first and a second split optical signal,
      modulate the first and the second split optical signals based on electrical signals to form first and second modulated optical signals,
      polarization multiplex the first and second modulated optical signals to form a polarization multiplexed signal; and
      transmit the polarization multiplexed signal via the PM fiber to the polarizing demultiplexing receiver, and
   wherein the polarizing demultiplexing receiver is configured to:
      polarization demultiplex the polarization multiplexed signal to form the first and second modulated optical signals,
      directly detect the first and the second split optical signals from the first and second modulated optical signals, and
      convert the first and the second split optical signals into to the electrical signals; and
   polarization maintaining connectors to mechanically couple the PM fiber, the polarizing multiplexing transmitter and the polarizing demultiplexing receiver.

2. The network device of claim 1, wherein the optical signal is generated using a dense wave division multiplexing (DWDM) source or a coarse wave division multiplexing (CWDM) source.

3. The network device of claim 1, wherein the PM fiber comprises a length that minimizes mode coupling.

4. The network device of claim 1, wherein the optical signal is generated by a 20-wavelength CWDM integrated source.

5. The network device of claim 4, wherein the 20-wavelength CWDM integrated source operates in C-band with a 200 GHz grid spacing.

6. The network device of claim 1, wherein the modulating the first and the second split optical signals comprises modulating each of the first and the second split optical signals with 20 integrated modulators based on a 28 GB/s on-off keying (OOK) modulation scheme.

7. The network device of claim 1, wherein the modulating the first and the second split optical signals comprises modulating each of the first and the second split optical signals with 20 integrated modulators based on a 14 GB/s differential quadrature phase shift keying (DQPSK) modulation scheme.

8. The network device of claim 1, wherein the modulating the first and the second split optical signals comprises modulating the first and the second split optical signals based on one of a 14 GB/s 4-Level amplitude shift keying (ASK) modulation scheme, or a differential phase shift keying (DPSK).

9. The network device of claim 1, wherein the network device comprises an integrated active cable design that connects the PM fiber directly to the polarizing multiplexing transmitter and the polarizing demultiplexing receiver.

10. The network device of claim 1, wherein polarizing multiplexing transmitter and the polarizing demultiplexing receiver are aligned to both polarization modes of the PM fiber.

11. The network device of claim 1, wherein the polarization multiplexed signal is transmitted in two polarizations that are separated throughout transmission.

12. The network device of claim 1, wherein the network device includes:
   a first polarized multiplexed transceiver, the first polarized multiplexed transceiver comprising:
      a first polarizing multiplexing transmitter, and
      a first polarizing demultiplexing receiver;
   a second polarized multiplexed transceiver, the second polarized multiplexed transceiver comprising:
      a second polarizing multiplexing transmitter, and
      a second polarizing demultiplexing receiver; and
   a duplex cable, the duplex cable comprising a first PM fiber and a second PM fiber, wherein the first PM fiber connects the first polarizing multiplexing transmitter and the second polarizing demultiplexing receiver, and the second PM fiber connects the first polarizing demultiplexing receiver and the second polarizing multiplexing transmitter to allow bidirectional communication.

13. The network device of claim 1, wherein a data rate associated with the network device is one of 400 Gigabit/second or 1 Terabit/second.

14. The network device of claim 1, wherein the network device is associated with communications equipment that includes one of a router, or a transport system.

15. A network device comprising:
   a polarizing multiplexing transmitter, the polarizing multiplexing transmitter comprising:
      an integrated wave division multiplexing (WDM) source to generate an optical signal including a plurality of wavelengths, a power splitter to generate a first split optical signal and a second split optical signal based on the optical signal, a first set of modulators and a second set of modulators to receive electrical signals from an electrical data interface and to modulate the first split optical signal and the second split optical signal based on electrical signals to form a first modulated split optical signal and a second modulated split optical signal, and a polarization multiplexer to polarization multiplex the first modulated split optical signal and the second modulated split optical signal to form a polarization multiplexed signal;

a polarization maintaining fiber to transmit the polarization multiplexed signal;

a polarizing demultiplexing receiver, the polarizing demultiplexing receiver comprising:

a polarization demultiplexer to receive the polarization multiplexed signal and to polarization demultiplex the polarization multiplexed signal to form the first modulated split optical signal and the second modulated split optical signal, a third set and a fourth set of modulators to detect a first set of wavelengths in the first modulated split optical signal and the second modulated split optical signal, and an electrical data interface to convert the first modulated split optical signal and the second modulated split optical signal to the electrical signals; and polarization maintaining connectors that mechanically couple the polarization maintaining fiber, the polarizing multiplexing transmitter and the polarizing demultiplexing receiver.

16. The network device of claim 15, wherein the polarization multiplexed signal is transmitted in two polarizations that are separated throughout transmission.

17. The network device of claim 15, wherein modulating the first and the second split optical signals comprises modulating each of the first and the second split optical signals with 20 integrated modulators based on a 28 GB/s on-off keying (OOK) modulation scheme.

18. The network device of claim 15, wherein modulating the first and the second split optical signals comprises modulating each of the first and the second split optical signals with 20 integrated modulators based on a 14 GB/s differential quadrature phase shift keying (DQPSK) modulation scheme.

19. A computer-implemented method comprising:

generating, via a polarizing multiplexing transmitter, an optical signal based on an integrated wave division multiplexing (WDM) source, splitting, via the polarizing multiplexing transmitter, the optical signal into a first split optical signal and a second split optical signal;

modulating the first split optical signal and the second split optical signal based on electrical signals to form a first modulated optical signal and a second modulated optical;

polarization multiplexing, via the polarizing multiplexing transmitter, the first modulated optical signal and the second modulated optical signal to form a polarization multiplexed signal;

transmitting the polarization multiplexed signal via a polarization maintaining fiber to a polarizing demultiplexing receiver;

receiving, by the polarized demultiplexing receiver, the polarization multiplexed signal;

polarization demultiplexing, by the polarizing demultiplexing receiver, the polarization multiplexed signal to form the first modulated optical signal and the second modulated optical signal;

directly detecting, by the polarizing demultiplexing receiver, the first split optical signal and the second split optical signal based on the first modulated optical signal and the second modulated optical signal;

converting the first split optical signal and the second split optical signal to electrical signals; and wherein the polarization maintaining fiber, the polarizing multiplexing transmitter and the polarizing demultiplexing receiver are mechanically coupled by polarization maintaining connectors.

20. The computer-implemented method of claim 19, wherein modulating the first and the second split optical signals further comprises:

modulating each of the first and the second split optical signals with 20 integrated modulators based on a 14 GB/s differential quadrature phase shift keying (DQPSK) modulation scheme.

* * * * *